Aug. 24, 1943.  K. R. BROWN ET AL  2,327,865
ELECTRICAL PROTECTIVE DEVICE
Filed Aug. 1, 1941  2 Sheets-Sheet 1
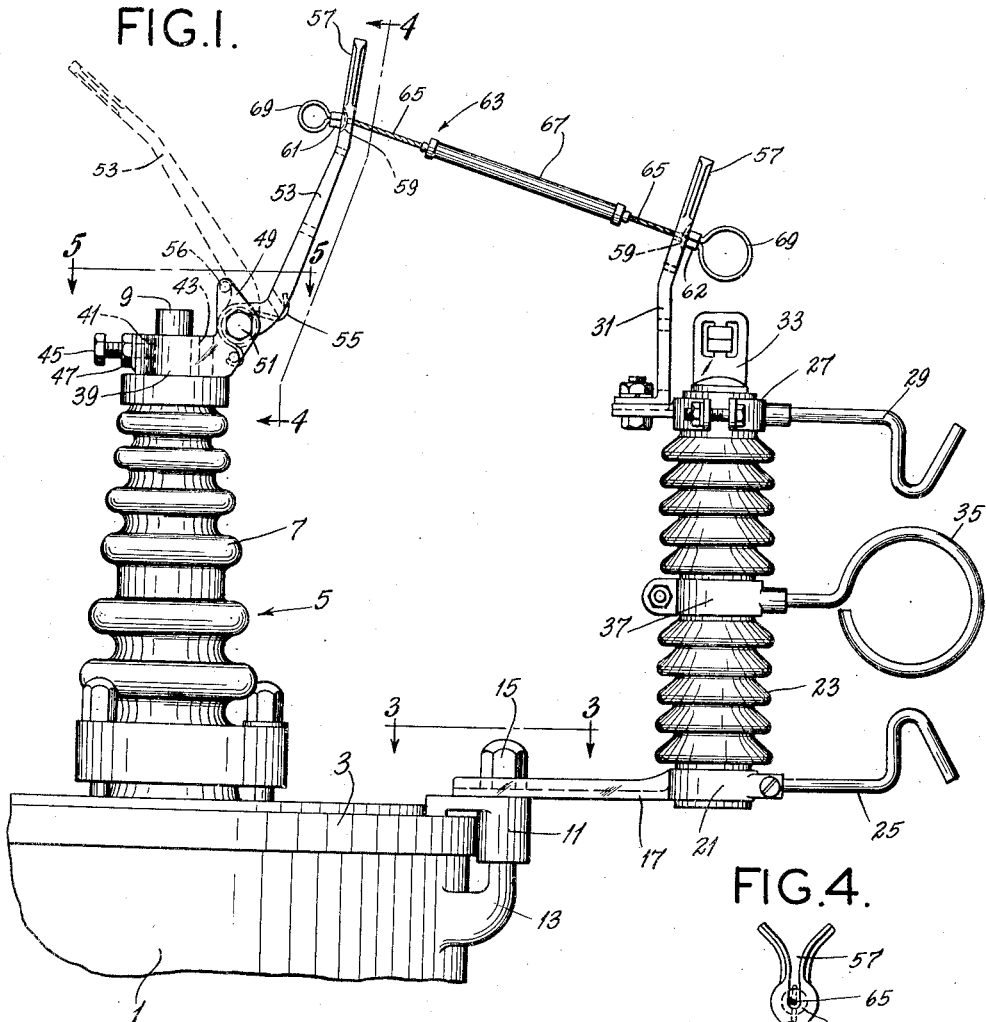
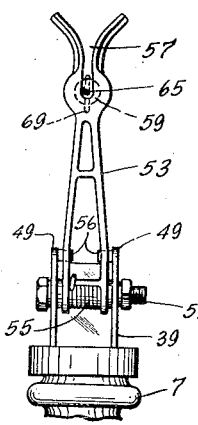
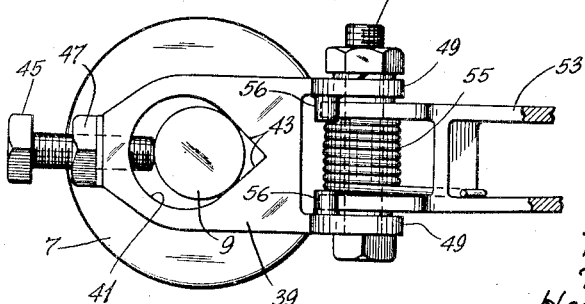
Kenneth R. Brown,
Murray C. Cooley,
Herbert H. Wefeler,
Inventors.
Haynes and Koenig,
Attorneys.

Aug. 24, 1943.  K. R. BROWN ET AL  2,327,865
ELECTRICAL PROTECTIVE DEVICE
Filed Aug. 1, 1941  2 Sheets-Sheet 2
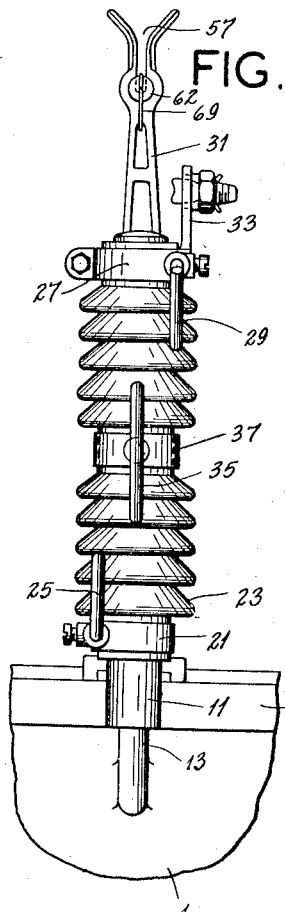
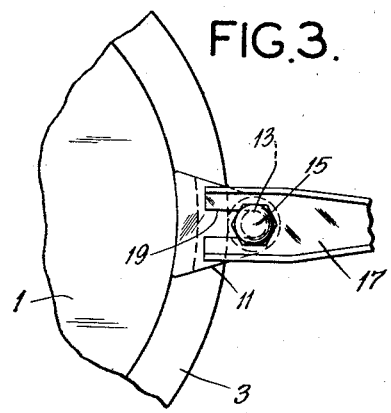
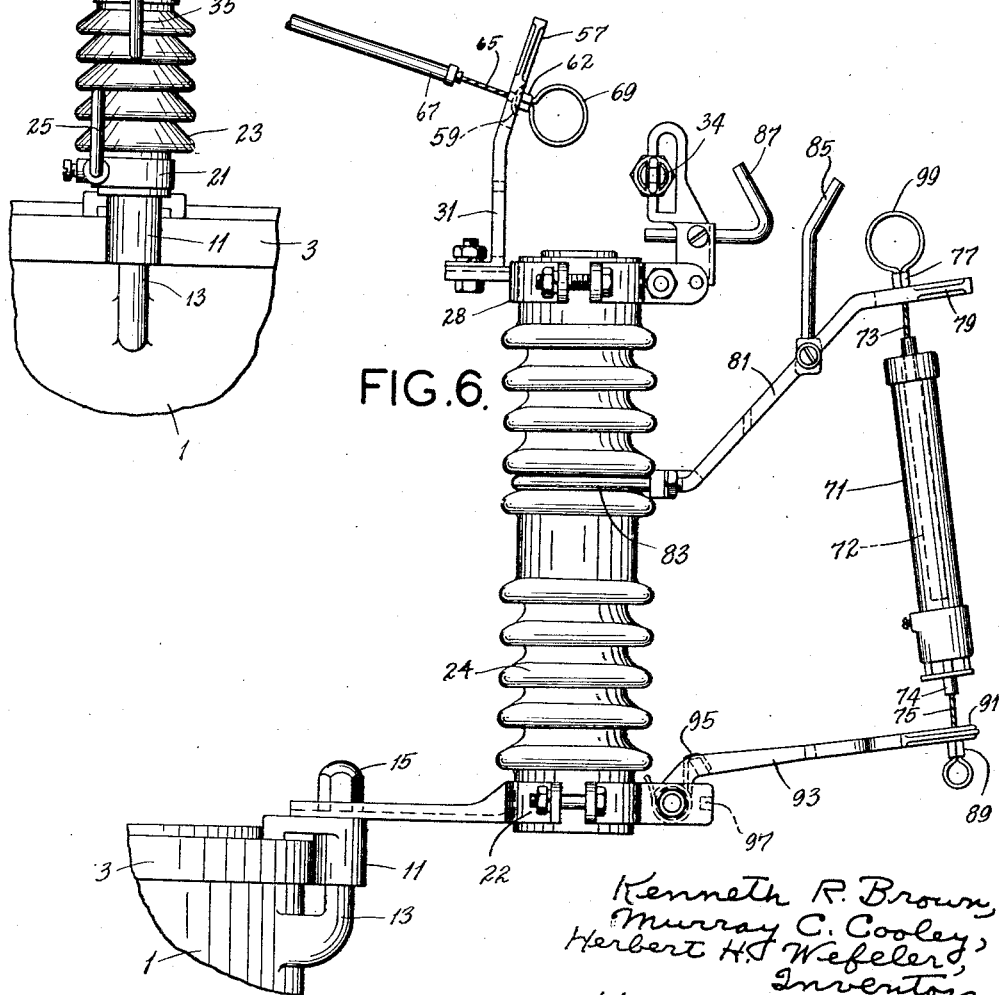
Kenneth R. Brown,
Murray C. Cooley,
Herbert H. Wefeler,
Inventors.
Haynes and Koenig
Attorneys.

Patented Aug. 24, 1943

2,327,865

UNITED STATES PATENT OFFICE 2,327,865

ELECTRICAL PROTECTIVE DEVICE

Kenneth R. Brown, Des Moines, Iowa, Murray C. Cooley, University City, and Herbert H. Wefeler, Webster Groves, Mo., assignors to W. N. Matthews Corporation, St. Louis, Mo., a corporation of Missouri Application August 1, 1941, Serial No. 405,044

19 Claims. (Cl. 200—115)

This invention relates to electrical protective devices, and with regard to certain more specific features, to transformer protective devices.

Among the several objects of the invention may be noted the provision of a simple protector which is freely adaptable to various transformers and transformer locations, requiring only a single line-wire lead and very low head-room and thus providing a high degree of safety; the provision of an economical form of the device which makes effective use of parts already available on a transformer, thus requiring few additional porcelain and metal parts and which is easy to service and maintain; and the provision of a device of the class described which places the transformer protection in the opening where suitable replacements, adjustments and fuse-size adaptations may readily be made. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of one form of the invention;

Fig. 2 is a right-end elevation of Fig. 1;

Fig. 3 is a fragmentary horizontal section taken on line 3—3 of Fig. 1;

Fig. 4 is a fragmentary bias section taken on line 4—4 of Fig. 1;

Fig. 5 is an enlarged fragmentary horizontal section taken on line 5—5 of Fig. 1; and, Fig. 6 is a fragmentary enlarged side elevation showing another form of the invention.

Similar reference characters indicate corresponding parts throughout the several views of the drawings.

Referring now more particularly to Fig. 1, there is shown at numeral 1 a transformer case having a cover 3 from which extends the ordinary transformer bushing 5. The bushing 5 is ordinarily well within the periphery of the cover 3. This bushing 5 includes an insulator 7 around a cylindric conductor rod 9. The bushing 5 forms an independent support for apparatus to be described. Rod 9 forms the electrical inlet to the transformer primary, the case 1 being grounded as is usual. The cover 3 is held down by lugs 11, three of these being used, for example. The lugs 11 slide over threaded fingers 13 extending from the case 1, and are held down by nuts 15. The above parts form the environment for the present invention.

At 17 is shown a rigid independent conducting bracket or support provided with an endwise elongated notch 19 for adjustable placement around one of the fingers 13. The bracket 17 is held down by one of the nuts 15 in any one of various rotary or translatory positions. It overhangs the side of the transformer, as indicated, forming a cantilever support for an insulator 23. The outer end of the bracket 17 comprises a clamp 21 around the lower end of said vertical insulator 23. From this clamp 21 extends a conducting gap-forming electrode 25.

At the upper end of the insulator 23 is a second clamp 27 which on one side carries an upper gap-forming electrode 29, and on the other side a rigid, upwardly extending conducting fork 31. The upper clamp 27 also supports a line wire connector 33. Intermediately positioned between the upper and lower gap electrodes 25 and 29 is a ring-shaped intermediate electrode 35 which is clamped midway on the insulator 23 by a clamp 37. The ring form of this electrode 35 is one of several forms that may be used.

As indicated in Fig. 2, the electrodes 25, 29 and 35 are angled laterally to prevent direct water drip between electrodes and so that any freezing drops in cold weather will not form icicle connections.

At 39 above the bushing insulator 7 is a conducting dog which has a partially circular opening 41 substantially larger than the conducting pin 9, said opening 41 being extended by a notch-shaped seating portion 43. Opposite the notch 43 is a screw clamp 45 which may be held at a predetermined holding setting by a lock-nut 47. By means of this connection, as indicated in Fig. 5, the lug 39 may be clamped at any angular position on said conducting pin 9.

The lug 39 has spaced arms 49 supporting between them a pivot 51 for a swinging conducting arm 53. A spring 55 normally biases the arm counterclockwise (Fig. 1) toward a pair of limiting stops 56.

The arms 31 and 53 are both forked at their ends, as indicated at 57. At the bases of the forks are sockets 59 for the reception of conducting heads 61 and 62 of a fuse link 63. The fuse link has flexible conductors 65 between said heads 61 and 62 and between the flexible conductors is a fuse container 67 containing a fuse in series with conductors 65. The fuse holds together conductors 65 and tube 67 simply surrounds the fuse. Outside of the heads 61 and 62 are rings 69. A lineman's stick is applied to large ring 69 for making application of the link between the arms 31 and 53. This is accomplished by first applying the head 61 to the conductor 53 when the latter is in the Fig. 1, dotted-line position, and then pulling over the head 62 and applying it to the rigid conductor 31. This biases the conductor 53 to its solid-line position and tensions the fuse link in a substantially lateral position as related to the bushing 5 and insulator 23. It will be seen that the arms 31 and 53 are flared outward at their ends when the link is connected, thus insuring proper sliding to a seat of the heads 61 and 62 in sockets 59, even though the lineman is not quite accurate in the application of the link. That is, there is an automatic sliding action of the fuse heads 61 and 62 toward the sockets 59 which positively holds the link in final position.

Only the large ring 69 will accommodate the ball point of the lineman's stick. This assures proper application of the fuse link since it is then impossible for the lineman to do anything but apply the head 61 to the socket 59 in the movable arm 53.

When the fusible section of the link blows, the flexible portions 65 are separated under the biasing action of the spring 55. The conductor 53 rotates counterclockwise under bias of spring 55 to the dotted-line position shown in Fig. 1.

When the parts are in the solid-line position shown in Fig. 1, and a line wire being connected at 33, current normally flows through the conductor 31, fuse link 63, conductor 53, through the conductor pin 9 and into the transformer. Upon overload in a transformer, the fuse link 63 blows, thus releasing the arm 53 to move to the dotted-line position and opening the supply circuit.

If an abnormal transient voltage condition occurs, such as a lightning stroke on the line, this is dissipated through the two gaps associated with the three electrodes 29, 35, 25, the discharge occurring through the bracket 17 and transformer case 1, which is grounded. After the transient condition ceases, the gaps stop any follow-up current at line voltage.

In view of the adjustments provided by the slot 19, and the fact that the bracket 17 may be applied to any one of several fingers 13 on a transformer case 1, and in view of the fact that the lug 39 may be adjusted to any rotary position on the pin 9, the device is freely adaptable to various transformers and to various locations on a transformer. The upwardly extending positions of the conductors 31 and 53 place the fuse link 63 in a more or less lateral position instead of the ordinary substantially vertical position, thus saving head-room and making the device safer with respect to overhead wires. The distance to such wires is increased by head-room saving. In addition only one lead is used to serve the fuse and gap parts.

Very few parts are needed, since use is made of the insulator 7 of the transformer bushing for part of the insulating construction, and the transformer case is used as part of the voltage gap grounding construction. Only one additional insulator 23 is needed for both the grounding and fuse devices. Essentially, the metal parts consist in a hinged arm for 9, angled arms for the top of insulator 23 and two lower conducting arm attachments extending from 23.

In Fig. 6 is shown a part of another form of the invention, in which like numerals designate like parts. In this case, the voltage-gap part of the construction is one in which a removable enclosed-gap member is used for one gap, in association with an upper exposed gap. Such a gap construction is particularized in the United States patent application of Carl E. Mosely, Serial No. 345,944, filed July 17, 1940, for Electrical apparatus, and briefly consists of a tube 71 within which is an electrode 72 providing a voltage gap with respect to a lower electrode 74, said electrodes being electrically connected to flexible connectors 73 and 75 located outside of the tube 71. The upper connector has a head 77 which seats at the base of a fork 79 located on a rigid conducting extension 81 which latter is clamped at 83 to the insulator 24. The conductor 81 has an upwardly extending gap-forming member 85 which is opposite an adjustable gap-forming member 87 associated with the clamp 28. The line-wire connector is at 34.

The lower flexible conductor 75 has a head 89 for association with a holder 91 of an oscillating conducting arm 93. The arm 93 is normally biased down by a spring 95 toward a stop 97 associated with the clamp 22. Thus is provided a replaceable internal-gap device which is renewable between conductors 81 and 93, in association with the permanent open gap between conductors 85 and 87.

A fresh gap tube 71 is applied by applying a lineman's stick to the ring 99 and placing the member 89 in the grip 91. This is when the arm 93 is biased down. Then by raising the stick, the arm 93 is moved up and the member 77 applied to its seat in the gripping fork 79. This places the parts in the condition shown in Fig. 6 wherein 93 is biased down. For removal the head 77 is removed from fork 79 and after the conductor 93 has moved down to stop 97 the head 89 is removed from 91.

It will be seen that the use only at the top of the tube 71, of a large ring 99 large enough to go over the ball point of a lineman's stick, insures proper and upright application of the gap tube.

One feature of importance of this invention is the fact that the line wire when connected to 33 or 34, as the case may be, is always associated with a grounded gap construction, regardless of whether or not the fuse within 67 has blown. In prior structures blowing of the fuse link has the result of disconnecting the line wire from its gap protection apparatus. Thus this apparatus provides permanent safety against transient overvoltages.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Protective apparatus comprising a line wire connection having a conducting arm, an insulator supporting said connection, conducting means for supporting said insulator and having an adjustable support, gap means between said line wire connection and the support and located on said insulator, a conducting arm having an adjustable rotary connection with respect to a second insulator and extending upwardly, said arm being adjustable into the plane of the arm of said line wire connection, means biasing said second arm from the first arm, and a laterally located removable fuse link attached to said arms.

2. Electrical protective apparatus comprising a conductor, a vertical insulator, a cantilever conducting support for said insulator, said support being adjustable on a ground, a line wire connection to the upper end of said insulator, voltage gap means between said line wire connection and said support, upwardly extending conducting and holding means from said line wire connection, an adjustable attachment to the conductor, a movable conductor arm extending upwardly from said adjustable attachment, means normally biasing said upwardly extending arm away from said vertical insulator, and a fuse link attached to and tensioned between said arm and said holding means, said fuse link being laterally positioned with respect to the insulator and the conductor.

3. Elevtrical protection apparatus comprising a conductor, a vertical insulator, a support for said insulator adjustably supported on a ground, a line wire connection on said insulator, voltage gap means between said line wire connection and said support, upwardly extending conducting and holding means from said connection, a conducting attachment on said conductor, a movable conductor arm extending from said attachment, means normally biasing said arm away from said vertical insulator, and a fuse link attached to and tensioned between said arm and said holding means, said fuse link being laterally positioned with respect to the insulator and the conductor.

4. Protection apparatus comprising a conducting connection, an insulator spaced therefrom, adjustable conducting means at the lower end of the insulator for adjustably attaching it to a grounded point, a conductor at the upper end of said insulator having an upwardly extending holding portion, voltage gap means between said upwardly extending holding portion and the conducting means at the lower end of said insulator, and a hinged conducting arm mounted upon said conducting connection, said last-named hinged conducting arm being biased away from the conductor at the upper end of said insulator, and a tensioned fuse link mounted between said arm and said conductor on the insulator.

5. Protection apparatus comprising a vertical conductor connection, a spaced vertical insulator, an adjustable lateral conducting arm at the lower end of the insulator, means for adjustably attaching said arm to a ground, an L-shaped conductor at the upper end of said insulator having an upwardly extending portion and a line wire connector, voltage gap means between said L-shaped conductor and the adjustable conducting means at the lower end of said insulator, and a rotary adjustable member mounted upon said vertical conductor connection, a hinged conducting arm on said last-named member, said hinged conducting arm being biased away from the L-shaped conductor, and a tensioned fuse link mounted between said hinged conducting arm and the L-shaped conductor.

6. Protection apparatus comprising an adjustable rotary clamp means for adjustable attachment, an upwardly extending hinged conducting arm from said clamping means, means biasing said arm in a predetermined direction, link-holding means on the conducting arm, a second upwardly extending arm, link-holding means thereon, an insulating support for said second conducting arm, a conducting bracket supporting said insulating support, and an adjustable connection for said bracket, whereby said upwardly extending conducting arms may be adjusted into a common vertical plane, and a fuse link in said plane and held by said arms.

7. Protection apparatus comprising an adjustable rotary clamp means for adjustable attachment to a support, an upwardly extending hinged conducting arm from said clamping means, means biasing said arm in a predetermined direction, link-holding means on the arm, a second upwardly extending conducting arm, link-holding means thereon, an insulating support for said second conducting arm, and an adjustable conducting bracket supporting said insulator, whereby said upwardly extending conducting arms may be adjusted into a common vertical plane, and a fuse link in said plane and held by said arms, a line wire connector connected to the second conducting arm, and a voltage gap means between the line-wire connector and said adjustable conducting bracket.

8. Protection apparatus comprising a horizontally adjustable rotary clamp means for adjustable attachment to a vertical support, an upwardly extending conducting arm from said clamping means, means biasing said arm in a predetermined direction, link-holding means on the arm, a rigid second, upwardly extending conducting arm and link-holding means thereon, a vertical insulating support for said second conducting arm, a conducting bracket supporting said insulating support, a horizontally adjustable support for said bracket whereby said upwardly extending conducting arms may be predeterminately related in a vertical plane, a fuse link in said plane and held by said arms, said fuse link being substantially laterally located with respect to the vertical, and gap means located between said rigid upwardly extending conducting arm and the bracket, said gap means comprising two external gaps associated with said insulating support for the second arm.

9. Protection apparatus comprising an adjustable rotary clamp means for adjustable attachment to a support, an upwardly extending conducting arm from said clamping means, means biasing said arm in a predetermined direction, link-holding means on the arm, a second upwardly extending conducting arm and link-holding means thereon, an insulating support for said second arm, a conducting bracket supporting said insulating support, an adjustable connection for said bracket, whereby said upwardly extending conducting arms may be related in a vertical plane, a fuse link in said plane and held by said arms, and gap means located between said upwardly extending second conducting arm and the bracket, said gap means comprising one external and one internal gap.

10. Protective apparatus comprising a conductor arm providing a line wire connection, an insulator supporting said conductor arm, an adjustable support for said insulator, gap means between said conductor arm and the support and located on said insulator, a hinged conducting arm having a rotary connection with another support and extending upwardly, said hinged arm being adjustable into the plane of the first-named conductor arm, means biasing said second arm from the first arm, and a removable laterally located fuse link attached to said arms.

11. Apparatus of the class described, comprising a current inlet bushing, an insulated voltage gap means independently attached to a ground, conducting means attached to the inlet bushing, a fuse link, means extending from said independent voltage gap means and from said bushing attachment for supporting and tensioning said fuse link and a line wire connector feeding the voltage gap means and the link at a common point.

12. Apparatus of the class described comprising a current inlet bushing, an insulated voltage gap means independently attached to a ground, conducting means attached to the current inlet bushing, a fuse link, means extending up from said voltage gap means, and up from said conducting means on the bushing supporting and tensioning said fuse link in a lateral position, both of said attachments being independently adjustable.

13. Protective apparatus, comprising a ground and a current inlet bushing, a voltage gap means having two conductors, one of which is attached to the ground and a line wire connection to the other, a spaced biasing conductor attached to the inlet bushing opposite said voltage gap means, and a removable fuse link held by said biasing conductor, the attachments to the conductor bushing and to the ground both being horizontally adjustable.

14. Protective apparatus, comprising a current inlet, a ground, a voltage gap means having upper and lower conductors, a vertically located insulator to which said conductors are attached, the lower one of said conductors being attached to the ground and supporting the insulator, a spaced conductor attached to the current inlet opposite said voltage gap means, a removable fuse link held by said conductors in a position laterally with respect to said insulator, and means for adjusting the insulator support on the ground and the conductor on the current inlet.

15. Protective apparatus comprising an upwardly extending conductor arm providing a line wire connection, a vertical insulator supporting said conductor arm, a support for said insulator, unitary gap means between said conductor arm and the support and carried entirely by said insulator, a movable conducting arm, a support to which said movable conducting arm is hinged, said support having a rotary adjustable connection with a second and vertical support, and means biasing said second arm from the first arm, and a removable laterally located fuse link between said arms.

16. Protective apparatus comprising a conductor arm providing also a line wire connection, a vertical insulator supporting said conductor arm, gap means forming a unitary organization with said insulator, a movable conducting arm, a support to which said movable conducting arm is hinged for vertical movement, said support having a horizontally rotary connection with a second support whereby said hinged arm is adjustable for hinging movement in the plane of the first-named conductor arm, means biasing said second arm from the first arm, and a removable laterally located fuse link between said arms.

17. Protective apparatus comprising a conductor arm providing a line wire connection, an insulator independently supporting said conductor arm, an independent support for said insulator, gap means between said conductor arm and the independent support and carried entirely by said insulator, a second conducting arm having a hinged connection with a second independent support, and means biasing said second arm from the first arm, and a removable fuse member between said arms and tensioned thereby.

18. Protective apparatus comprising a conductor arm, an insulator independently supporting said conductor arm, an independent support for said insulator, gap means between said conductor arm and the support and forming a removable unit with said insulator, a second conducting arm having a vertical hinged connection with a second independent support, and means biasing said second arm from the first arm, and a removable fuse link between said arms and tensioned thereby, said fuse link lying substantially in the plane of said second hinged conducting arm.

19. Protective apparatus comprising a fixed conductor arm providing a line wire connection, a vertical insulator independently supporting said conductor arm, an independent adjustable support for said insulator, gap means between said conductor arm and the support and forming a removable unit with said insulator, a second conducting arm having a vertical hinged connection with a second independent support, and means biasing said second arm from the first arm, and a removable fuse link between said arms and tensioned thereby, said fuse link lying substantially in the plane of said second hinged conducting arm.

KENNETH R. BROWN.
MURRAY C. COOLEY.
HERBERT H. WEFELER.